Jan. 19, 1971     D. GOTSCH ET AL     3,555,921
TOOL WITH VARIABLE GEAR
Filed March 27, 1968     3 Sheets-Sheet 3
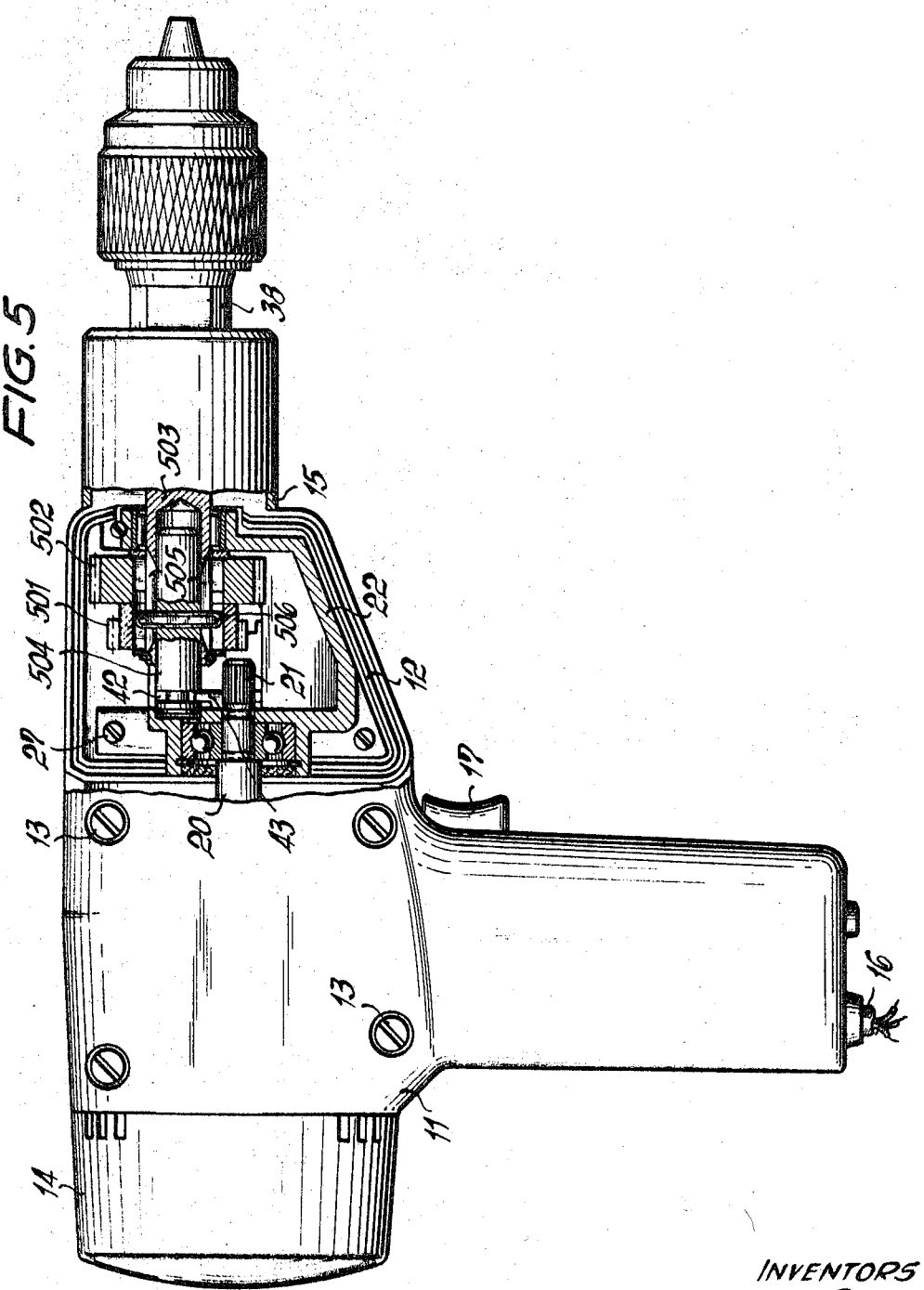
INVENTORS
Dieter GOTSCH
Alfred HETTICH
BY
their ATTORNEY

United States Patent Office 3,555,921
Patented Jan. 19, 1971

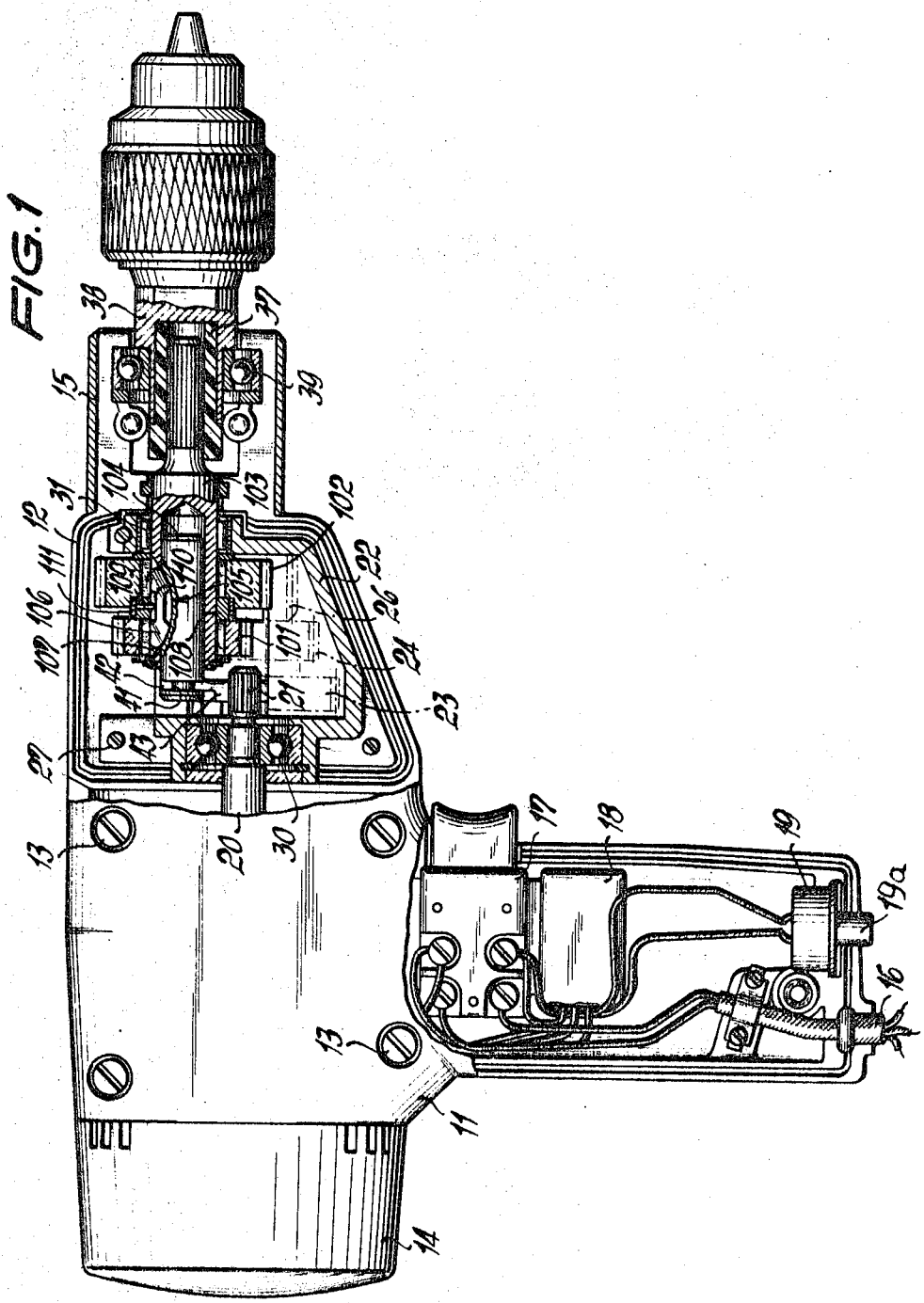

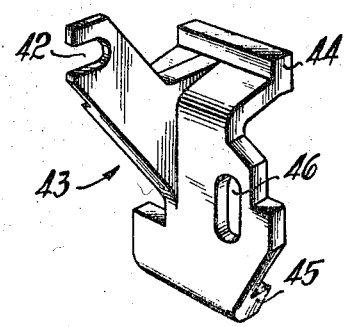
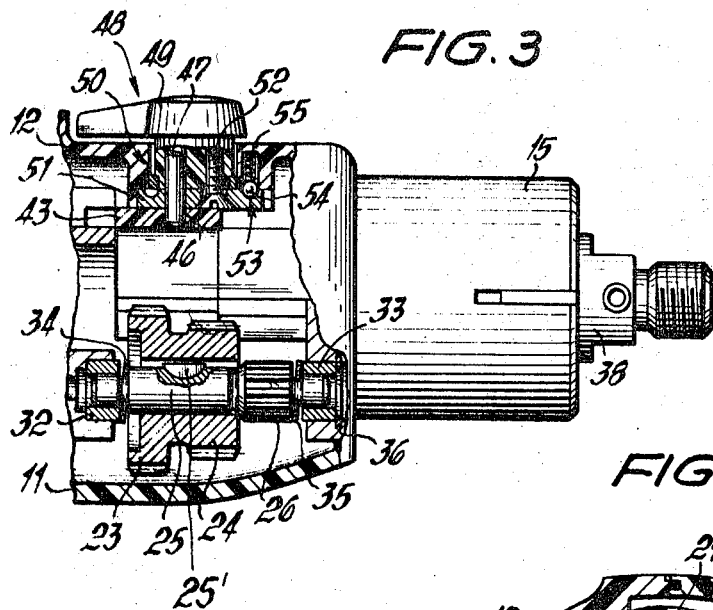
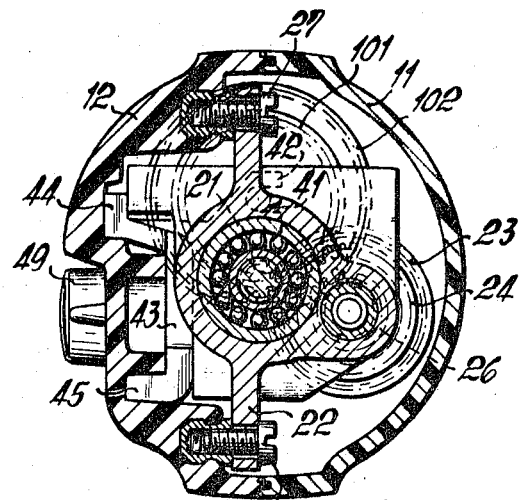

3,555,921
TOOL WITH VARIABLE GEAR
Dieter Gotsch, Plattenhardt, and Alfred Hettich, Echterdingen, Germany, assignors to Robert Bosch G.m.b.H., Stuttgart, Germany
Filed Mar. 27, 1968, Ser. No. 716,600
Claims priority, application Germany, Apr. 27, 1967, B 92,272
Int. Cl. F16h *3/08;* B23q *5/00*
U.S. Cl. 74—371                                                4 Claims

ABSTRACT OF THE DISCLOSURE

A housing encloses an electromotor having a drive shaft. A gear arrangement comprises a plurality of gears which are driven by the drive shaft, and two additional gear wheels which are continuously driven by the remaining gears at differential speeds and which are mounted freely rotatably on a rotatable output shaft for rotation with reference to the same. A control arrangement is associated with the gears and permits, at the will of the user of the tool, coupling of either one or the other of the two gear wheels with the output shaft so that the same is rotated by the respective gear in response to being coupled thereto.

BACKGROUND OF THE INVENTION

The present invention relates to tools in general, and more particularly to electrically operable tools. Still more specifically the present invention relates to power-driven tools.

Power-driven tools essentially consist, as is well known, of a prime mover and a gear arrangement which is driven by the prime mover and which in turn drives the output shaft of the respective tool. In circumstances where the gear ratio must be changed, that is where a variable-gear type of drive is to be used, single gears or sets of gears are shifted with reference to one another to obtain, by engagement of different gears with one another, a varied gear ratio.

In constructions of this type, where the variable gear utilizes shiftable gears or sets of gears, one of two approaches has heretofore been used. Either the axial spacing between the gears was selected large enough so that an idling position was present between two operative positions, or the idling position was eliminated and the gears were arranged axially adjacent without spacing so that, during change-over from one gear ratio to another, two sets of mating gears were always in engagement. Resort to the first approach evidently requires that the length of the gear arrangement exceed the total axial length of axially arrayed gear wheels by the distance required to accommodate the spaces which are required to accommodate the shiftable gear wheels in the respective idling positions thereof. In certain types of tools with which the present invention is particularly concerned, namely relatively small-dimensioned tools, this is not acceptable because it unduly enlarges the dimensions of the tool. While the same objection does not apply to the second approach which does indeed reduce the overall length of the gear arrangement, that type of construction requires that at least one of the driven gear wheels be mounted on its shaft by means of an overrunning coupling. The use of such couplings is well known and, generally speaking, very satisfactory in variable-speed gears. A notable exception, however, are applications where the available space is very limited, as in the type of tool with which the present invention is particularly concerned. Under these circumstances, the overrunning coupling would have to be of small dimensions and it has been found that under such circumstances, the couplings of this type are not reliable and easily sustain damage rendering the tool inoperative.

It is therefore a general object of the present invention to overcome the aforementioned disadvantages.

A more particular object of the present invention is to provide a tool of the type here under discussion which utilizes a variable gear arrangement of small overall dimensions but of high reliability.

An additional object of the invention is to provide such a tool wherein a change in the transmission ratio can be effected without resorting to shifting of any of the gear wheels.

Yet a further object of the invention is to provide a tool incorporating such an arrangement which is relatively simple to produce and which is inexpensive to manufacture and to sell.

SUMMARY OF THE INVENTION

In accordance with one feature of our invention we provide a tool, particularly an electrically operable tool, which comprises support means and a prime mover which is mounted on this support means. A rotatable output shaft is also carried by the support means. At least two gear wheels are operatively associated with the prime mover for rotation by the same and at differential speeds, these gear wheels are mounted on the output shaft freely rotatable with reference thereto. Furthermore, we provide control means including an actuating portion which is accessible to a user of the tool, and this control means is operable for coupling at the will of such user either one or the other of the aforementioned gear wheels with the output shaft whereby to effect rotation of the output shaft at the speed of the respective gear wheel which has been coupled thereto.

With the tool according to our invention the two gear wheels mentioned above—and it should be understood that there may of course be more than these two gear wheels—are constantly being rotated by being in mesh with the remaining gear wheels of the gear arrangement which are being driven by the prime mover. The output shaft, however, on which these two gear wheels are mounted and with reference to which they rotate, will itself rotate only if and when it is coupled with one or the other of these two gear wheels. Simultaneous coupling of the shaft with both gear wheels cannot occur and is not intended for the obvious reasons that this would lead to damage. In view of the fact that the arrangement according to our invention requires no shifting of any gear wheel, the length of the total gear arrangement is dictated exclusively by the axial thickness of the various gear wheels which are axially arrayed but which do not undergo any shifting. Evidently, our invention also eliminates any need for utilizing an overrunning coupling, a fact which greatly enhances the reliability of a tool so constructed and its resistance to damage, or improper operation.

The novel features which are considered as characteristic are set forth in the appended claims. The invention itself, however, both as to its construction and its method of operation, together with additional objects and advantages thereof, will be best understood from the following detailed description of specific embodiments when read in connection with the accompanying drawings.

BRIEF DESCRIPTION OF THE DRAWINGS

FIG. 1 is a side-elevational view, partly broken away and partly in longitudinal section, of a tool incorporating one embodiment of our invention;

FIG. 2 is a perspective view of a connecting member according to our invention and utilized for example in FIG. 1;

FIG. 3 is a top-plan fragmentary view, partly broken away and partly in longitudinal section of a portion of FIG. 1;

FIG. 4 is a vertical section, on an enlarged scale, through the gear arrangement shown in FIG. 1; and FIG. 5 is a view substantially similar to FIG. 1 but

DESCRIPTION OF THE PREFERRED EMBODIMENTS

In considering the various figures of the drawing, it is to be noted that reference numerals 1–55 designate elements which are common to the embodiments of FIGS. 1 and 5. Elements identified with reference numerals 101–111 are specific to the embodiment of FIG. 1, and elements identified with reference numerals 501–506 are specific to the embodiment of FIG. 5.

Keeping this in mind and discussing now the drawing in more detail, it will be noted that FIG. 1 illustrates a tool which will be recognized as an electric drill. More specifically, the tool illustrated in FIG. 1 is an electric drill of the hand-held type which is well known. In the illustrated embodiment the drill comprises a housing which consists of two shaped housing sections 11 and 12 of synthetic plastic material. These housing sections 11 and 12 are connected in the illustrated embodiment by means of screws 13, and when the tool is in fully assembled condition, they embrace and conceal the motor and the gear arrangement. Furthermore, the sections 11 and 12 define in their assembled condition a pistol grip-shaped handle of the tool, and this handle, it will be noted in FIG. 1, houses the electrical control components. The prime mover, which of course here is an electromotor, is not illustrated because it is completely conventional and does not form a part of the present invention. At the collector side of the electric motor, the housing is closed by means of a cap 14 which may be connected to the remainder of the housing by being slidingly inserted into a suitably dimensioned aperture defined by the sections 11 and 12, to which latter it is connected by means of two or more screws which are not illustrated. The purpose of making this cap readily removable is to afford access to the brushes of the motor. Again, this is not illustrated and is being mentioned here only for the sake of information. At the other end of the housing, that is the end which is adjacent the chuck, a metallic ring 15 surrounds portions of the sections 11 and 12 and is advantageously secured to the same by means of one or more non-illustrated screws. The purpose of this ring is to permit clamping of the tool in a vise or other holder without damaging the housing, or to permit clamping of auxiliary elements to the tool, such as elements which may be utilized to convert the tool from a drill into a reciprocating saw, or the like.

A power cable 16, which is of course adapted to be connected to a source of electrical energy, enters the housing of the tool at the bottom of the handgrip and is connected in the usual manner with the electric motor as well as with a pushbutton switch 17 which permits the operator to establish and interrupt the supply of electrical energy to the motor at will. The handgrip further houses, as is illustrated, an anti-interference condenser 18 and an overload protector 19, the purpose of the latter being to interrupt the supply of electrical energy if the tool is overloaded, in which case, the reset button 19a will project through a suitable aperture in the handgrip portion. When the overload conditions have been removed the reset button 19a is pushed in and the supply of electrical energy is restored.

It will be seen that the single component of the electric motor which is illustrated in FIG. 1 is the driven shaft 20 whose free end is provided with, or has formed therein in suitable manner, a pinion gear 21. Forwardly of the handgrip portion, the housing accommodates a metallic frame 22 which surrounds and supports the various components of the gear arrangement. FIG. 1 shows that the pinion gear 21 provided on the drive shaft 20 projects into the interior of this frame. The latter is fastened to one of the housing sections, in the illustrated embodiment to the housing section 12, via screws 27.

A gear wheel 23, illustrated in FIG. 1 in phantom lines and more clearly shown in FIG. 3, meshes with the pinion gear 21 and in turn is integral with another gear wheel 24. The latter is also shown in phantom lines in FIG. 1 but is more readily visible in FIG. 3. The combined gear wheels 23–24 are mounted by means of a Woodruff key 25' on a jackshaft 25 whose front end, namely the one facing towards the chuck, is also provided with or has formed therein a pinion gear 26. A gear wheel 101 meshes with the gear 24 and a gear wheel 102 meshes with the pinion gear 26. Both of the gear wheels 101 and 102 are mounted on an output shaft 103 of the gear arrangement. It is to be noted that neither of the gear wheels 101 or 102 which are of course of different size as is illustrated in FIG. 1, is movable in axial direction of the output shaft 103, but that both are freely rotatable on the output shaft 103 and with reference thereto. In other words, the gear wheels 101 and 102 can rotate about the output shaft 103 independently of whether or not the latter rotates.

The motor output shaft 20 is supported in the frame 22 with an antifriction bearing 30. The output shaft 103 is similarly supported in the frame 22 by means of a needle bearing 31 whereas the jackshaft 25 is supported in two sleeve bearings 32 and 33. It is to be noted that the outer diameter of the sleeve bearing 33 is so selected that the jackshaft 25 with the pinion gear 26 thereon can be introduced into the interior of the frame 22 through the bore provided in the frame which is adapted to subsequenty accept the sleeve bearing 33. As the jackshaft 25 is thus introduced, the gear wheels 23 and 24 which are integral with one another are pushed on to the jackshaft which latter is secured against movement with reference to the sleeve bearings 32 and 33 by two spring rings 34 and 35 which prevent axial movement. Once the jackshaft is thus positioned within the interior of the frame 22, the sleeve bearing 33 is introduced into the bore of the frame 22 and secured against outward movement with a spring ring 36 which engages in an inner circumferential groove provided in the frame 22.

FIG. 1 shows that a tool spindle 38 is press-fitted onto the output shaft 103 via the intermediary of an insulating sleeve 37, and the spindle 38 is journalled within the housing via the antifriction bearing 39.

In accordance with the invention, a cylindrical pin member 104 is received within the hollow output shaft 103 and extends outwardly of the latter at the end thereof which faces the motor. That portion of the member 104 which extends outwardly of the output shaft 103 is provided in its outer circumferential surface with a circumferential groove 41. The coupling member 43, which is illustrated in FIG. 2, engages with a forked portion 42 in this groove 41. The coupling member 43 itself is guided in the housing section 12, as illustrated in FIG. 4, by means of two glide surfaces 44 and 45. An elongated slot 46 is provided in the coupling member 43 and the slot 46 extends transversely of the direction of sliding movement of the member 43.

As is more clearly illustrated in FIG. 3, a pin 47 which is mounted on a rotary switch 48 and which can be turned in an arcuate path through 180° on rotation of the switch 48, engages in the slot 46. The switch 48 is composed of a knob 49 which is turnably arranged in an opening 50 of the housing section 12, and a disc 51 which is secured to the knob 49 from the inside of the housing section 12 by means of an off-center screw 52. The pin 47 penetrates the disc 51 and is also secured in off-center relationship to the knob 49, thus preventing the disc 51 from turning movement relative to the knob 49 and constituting an eccentrically movable member. The disc 51 is provided with two bores 53 which are angularly spaced through 180° and are provided on that side of the disc 51 which faces towards the exterior of the housing section 12. A ball 54 which is subjected to the pressure of a coil spring 55, can snap into one or the other of these bores 53.

FIG. 1 shows that the member 104 is provided with a recess 105 which extends in the axial direction of the member 104 and which is of arcuate configuration. Positioned in this recess 105 is a member 106 which has a surface configurated to correspond substantially to the surface bounding the recess 105. The member 106 projects radially outwardly of the recess 105 into a complementary recess 107 provided so as to pierce the wall of the output shaft 103. The configuration and size of the member 106 is such that in its neutral or center position, which is illustrated in FIG. 1, the member 106 will not project outwardly beyond the circumferential surface of the output shaft 103. A ring 108 is secured to and surrounds the output shaft 103 in such a manner that it is located in a position where it surrounds the recess 107 centrally intermediate the opposite axial ends thereof. The ring 108 is provided with a radially inwardly projecting pin 109 whose rounded inner end is received in a longitudinal slot 110 provided in the member 106. A second and thinner holding ring 111 is carried on the ring 108 and prevents the pin 109 from sliding radially outwardly out of the bore provided in the ring 108. Of course, the pin 109 could also be secured in another manner. The inner circumferential surfaces bounding the bores of the gear wheels 101 and 102 are provided with radially inwardly extending projections whose width corresponds to the recesses 105 and 107 and the larger gear wheel 102 is provided with an axial recess so that it will at least partially accommodate the rings 108 and 111 therewithin.

In operation of the device according to the present invention the knob 49 is rotated, causing the pin 47 to glide in the slot 46 of the member 43. The latter is thereby shifted longitudinally of the tool with the result that its forked portion 42 effects longitudinal shifting of the member 104. In turn, the member 104 carries along the member 106 until the point is reached where the pin 109 abuts against the end wall limiting the groove 111. On continued movement of the member 104 in the original direction, the member 106, which now abuts against the pin 109, slides in the arcuately configured recess 105 and tilts with one of its ends upwardly so that this end projects out of the recess 107 of the output shaft 103 into the space between two of the angularly spaced inner projections on that one of the gear wheels 101 or 102 into whose bore the outwardly tilted end portion projects. Inasmuch as both of the gear wheels 101 and 102 are constantly driven, the connection effected in this manner with respective ones of the gear wheels results in rotation of the output shaft 103 by the thus coupled gear wheel and at the rotational speed of the same. It is clear, of course, that in the position illustrated in FIG. 1, that is the neutral position, the member 106 does not couple the output shaft 103 with either of the gear wheels 101 or 102.

Coming now to the embodiment illustrated in FIG. 5, it will be seen that this is substantially similar to that illustrated in FIG. 1. It differs from the embodiment in FIG. 1 in that the cylindrical sliding member, which is here identified with reference numeral 504 and which is located within the hollow output shaft 503 is provided with a bore extending transversely of its axial elongation. A pin 506 is immovably secured in this bore so that it projects from the member 504 at diametrally opposite points thereof. The pin 506 is provided with flattened portions at least where it projects beyond the member 504, and the output shaft 503 is provided with two diametrally opposed longitudinally extending slots 505 whose width corresponds to the width of the projecting portions of the pin 506. The inwardly extending projections provided in the bores of the gear wheels 501 and 502 are angularly spaced at a distance corresponding substantially to the width of these slots 505. It will be seen that the pin 506 projects outwardly of the output shaft 503 to such an extent that the outwardly projecting portions can extend into the space between two angularly adjacent ones of the projections which are provided on the respective inner circumferential surfaces bounding the bores of the gear wheels 501 and 502. In accordance with the inventive concept of the embodiment of FIG. 5, the gear wheels 501 and 502 are not axially spaced as is the case in FIG. 1, but rather are directly axially adjacent to one another. The inwardly extending projections provided within their respective bores extend only over part of the axial length of each of the gear wheels 501 and 502, as illustrated in FIG. 5, in such a manner that they terminate short of that axial end of the respective bore which is located adjacent the other gear wheel. Thus, there is defined in the region of the junction between the two gear wheels 501 and 502 a free space wherein the inner circumferential surfaces bounding the respective bores are not provided with such projections.

In the embodiment illustrated in FIG. 5 the pin 506 is in engagement with the inwardly extending projections of the gear wheel 501 so that the output shaft 503 is driven by the gear wheel 501. Conversely, if the pin 506 is moved into engagement with the inwardly extending projections within the gear wheel 502 then the output shaft will be driven by the gear wheel 502. If, however, the projecting portions of the pin 506 are located in the unobstructed central space, that is the space between the projections of the gear wheel 501 on the one hand and the projections of the gear wheel 502 on the other hand, then the pin 506 and through it the output shaft 503 will not be connected with either one of the gear wheels 501 or 502 so that the output shaft 503 thus will not be rotated.

Operation of the embodiment in FIG. 5 corresponds substantially to what has been described with FIG. 1. On turning of the knob 49 (see FIG. 3) the member 504 will be axially shifted in one or the other axial direction depending upon the direction of rotation of the knob 49. This brings the projecting portions of the pin 506 into engagement with either the inwardly extending projections of the gear wheel 501 or those of the gear wheel 502 so that the output shaft 503 will be rotated at the speed of rotation of the respective gear wheel which is at the time connected with the output shaft. When the knob 49 is turned to rest position, in which the pin 506 projects into the space where no inwardly extending projections are provided, then the output shaft 503 will not be rotated.

By resorting to our invention we are able to provide tools having two-stage gear arrangements of particularly short axial length and of great dependability. It is clear, of course, that the present invention may be utilized not only in electrically operable tools, as has been illustrated herein for the sake of example, but is generally applicable to gear arrangements of the type in question regardless of their particular application.

It will be understood that each of the elements described above, or two or more together may also find a useful application in other types of constructions differing from the types described above.

While the invention has been illustrated and described as embodied in a tool, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific objects of this in-

What is claimed as new and desired to be protected by Letters Patent is set forth in the appended claims:

1. A tool, particularly an electrically operable tool, comprising, in combination, support means including a housing; a driven shaft mounted in said support means; a rotatable output shaft carried by said support means and having an axial bore and an outer circumferential surface provided with an outer recess extending to said bore; at least two gear wheels operatively associated with said driven shaft and being rotated by the same at differential speeds, said gear wheels being mounted on said output shaft freely rotatable with reference thereto and each having an inner circumferential surface surrounding said outer circumferential surface with radial clearance and provided with a plurality of inwardly extending projections terminating short of said outer circumferential surface; drive gear means cooperating with said driven shaft and meshing with said gear wheels for rotating the latter; a supporting cage surrounding and supporting said drive gear means, gear wheels and output shaft; control means, including an elongated member axially slidable in said bore and formed with an inner recess constituting an extension of said outer recess, an engaging portion accommodated in said output shaft partially received in said inner recess and having opposite side faces extending in parallelism with the axis of said output shaft, said engaging portion being displaceable in response to axial sliding of said elongated member between a neutral position in which it is substantially flush with said outer circumferential surface, and two operative positions in which it respectively projects outwardly beyond said outer circumferential surface and into coupling engagement with the projections of one of said gear wheels, and an actuating portion accessible to a user and operable for displacing at the will of the user said engaging portion between said neutral position and the respective operative position so as to couple in the respective operative positions either one or the other of said gear wheels with said output shaft for effecting rotation of the latter at the speed of the respective gear wheel; and a ring member mounted on and exteriorly surrounding said output shaft and said recess and constituting a pivot about which said engaging portion tilts for movement between said neutral and operative positions.

2. A tool as defined in claim 1, wherein said connecting element comprises a main body portion having a general plane normal to the general plane of said bifurcated arm and parallel to said axial direction of said bore, said connecting element being shiftable in axial direction of said bore normal to the general plane of said bifurcated arm, and said main body portion being provided with an elongated slot extending normal to said axial direction.

3. A tool, particularly an electrically operable tool, comprising, in combination, support means including a housing; a driven shaft mounted in said support means; a rotatable output shaft carried by said support means and having an axial bore formed with an open end and an outer circumferential surface provided with an axial slot communicating with said bore; at least two gear wheels operatively associated with said driven shaft and being rotated by the same at differential speeds, said gear wheels being mounted axially adjacent one another on said output shaft freely rotatable with reference thereto and each having an inner circumferential surface bonding a central axial opening which surrounds a respective portion of said outer circumferential surface with radial clearance and is provided with a plurality of inwardly extending projections terminating short of said outer circumferential surface; drive gear means cooperating with said driven shaft and meshing with said gear wheels for rotating the latter; a supporting cage surrounding and supporting said drive gear means, gear wheels and output shaft; and control means, including an elongated member received in said bore movable between two first positions and a second position and having a terminal section extending outwardly of said bore and being provided with a circumferential groove, an engaging portion having opposite side faces extending in parallelism with the axis of said output shaft and being accommodated in the same for displacement between a neutral position in which it is substantially flush with said outer circumferential surface and two operative positions in which it respectively projects outwardly beyond said outer circumferential surface and into coupling engagement with the projections of one of said gear wheels, an actuating portion accessible to a user and operable for displacing at the will of the user said engaging portion between said neutral position and the respective operative positions so as to couple in the respective operative positions either one or the other of said gear wheels with said output shaft for effecting rotation of the latter at the speed of the respective gear wheel, and a connecting element associated with said actuating portion and including a bifurcated arm engaging in said circumferential groove and connecting said connecting element to said elongated member for effecting sliding movement of the latter between said first and second positions, said engaging portion being received in said slot associated with said elongated member and being operative for moving between said neutral and operative positions for engaging in the latter said projections of one or the other of said gear wheels in response to movement of said elongated member to one of said first positions, and for disengaging from said projections of both of said gear wheels in response to movement of said elongated member to said second position.

4. A tool as defined in claim 2, wherein said actuating portion comprises a handle turnable about an axis and a pin carried eccentrically by said handle extending into said slot of said main body portion and being movable in an arcuate path in response to turning of said handle about said axis to thereby effect sliding of said connecting element in axial direction of said bore.

References Cited
UNITED STATES PATENTS

| | | | |
|---|---|---|---|
| 2,072,551 | 3/1937 | Forss | 173—163 |
| 2,829,285 | 4/1958 | Steiner et al. | 173—163 |
| 1,872,862 | 8/1932 | Wise | 74—606X |
| 2,377,575 | 6/1945 | Ringer | 192—48.9 |
| 2,717,672 | 9/1955 | Maurer | 173—15 |
| 3,028,763 | 4/1962 | Vetsch | 74—371 |
| 3,178,956 | 4/1965 | Stanley | 74—369X |
| 3,396,593 | 8/1968 | Moores, Jr. | 74—371 |

WILLIAM L. FREEH, Primary Examiner

U.S. Cl. X.R.

173—15; 192—48